United States Patent
Jiang et al.

(10) Patent No.: US 8,974,577 B2
(45) Date of Patent: Mar. 10, 2015

(54) SORBENT COMPOSITIONS, SORBENT ARTICLES, METHODS FOR PREPARING SORBENT ARTICLES, AND METHODS FOR CAPTURING TARGET GASES USING THE SORBENT ARTICLES

(71) Applicant: Corning Incorporated, Corning, NY (US)

(72) Inventors: Dayue David Jiang, Painted Post, NY (US); Steven Bolaji Ogunwumi, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 143 days.

(21) Appl. No.: 13/868,332

(22) Filed: Apr. 23, 2013

(65) Prior Publication Data

US 2014/0311341 A1    Oct. 23, 2014

(51) Int. Cl.
*B01D 53/62* (2006.01)
*B01J 20/22* (2006.01)
(Continued)

(52) U.S. Cl.
CPC ............ *B01D 53/0407* (2013.01); *B01D 53/50* (2013.01); *B01D 2253/202* (2013.01);
(Continued)

(58) Field of Classification Search
CPC .... B01D 53/04; B01D 53/0407; B01D 53/48; B01D 53/50; B01D 53/52; B01D 53/56; B01D 53/62; B01D 2253/202; B01D 2253/25; B01D 2257/302; B01D 2257/304; B01D 2257/306; B01D 2257/402; B01D 2257/504; B01J 20/22; B01J 20/32; B01J 20/3242

USPC ............. 96/153, 154; 95/129, 135–137, 139, 95/900; 502/401, 402; 423/230, 239.1, 423/244.01, 244.02; 427/244
See application file for complete search history.

(56) References Cited

U.S. PATENT DOCUMENTS 5,492,683 A * 2/1996 Birbara et al. ................ 423/230
7,402,198 B2    7/2008 Mori et al. ...................... 96/108
(Continued)

FOREIGN PATENT DOCUMENTS

EP        1428574        6/2004    ............. B01J 20/28
WO    2012/118587        9/2012

OTHER PUBLICATIONS

Wegmann, et al. Poly(ethylene-co-acrylic acid) Stationary Phases for the Separation of Shape-Constrained Isomers, Apr. 15, 2001, *Anal. Chem.*, vol. 73, No. 8, pp. 1814-1820.
International Search Report and Written Opinion, dated Jul. 31. 2014, pp. 1-11, International Patent Application No. PCT/US2014/034060, European Patent Office, The Netherlands.
(Continued)

*Primary Examiner* — Frank Lawrence

(57) ABSTRACT

Articles for capturing or separating a target gas from a gas stream may include a porous substrate such as a flexible sheet or mat, or a rigid ceramic monolith impregnated or coated with a sorbent composition. The sorbent composition may include a polyamine and a coexistent polymer chemically bonded to the polyamine. The polyamine may include a polyethylenimine. The coexistent polymer may include a polyurethane, a polyolefin-acrylic acid copolymer, or a combination thereof. The sorbent composition may be substantially less water-insoluble than compositions containing only a polyamine and may have high durability and good adsorption capacity for acidic target gases such as carbon dioxide. Methods for preparing the articles using aqueous polymer solutions are provided. Methods for capturing or separating target gases using the articles are provided.

20 Claims, 6 Drawing Sheets

(51) Int. Cl.
*B01D 53/04* (2006.01)
*B01D 53/50* (2006.01)
*B01D 53/52* (2006.01)
*B01D 53/56* (2006.01)
*B01J 20/32* (2006.01)

(52) U.S. Cl.
CPC .......... *B01D2257/302* (2013.01); *B01D 53/52* (2013.01); *B01D 53/62* (2013.01); *B01D 53/56* (2013.01); *B01D 2257/306* (2013.01); *B01J 20/22* (2013.01); *B01D 2253/25* (2013.01); *B01D 2257/504* (2013.01); *B01D 2257/402* (2013.01); *B01D 2257/304* (2013.01); *B01D 53/04* (2013.01); *B01J 20/3242* (2013.01)
USPC .................. 95/129; 95/135; 95/136; 95/137; 95/139; 96/153; 96/154; 423/230; 423/239.1; 423/244.02; 502/401; 427/244

(56) References Cited

U.S. PATENT DOCUMENTS

| | | | |
|---|---|---|---|
| 8,152,902 B2 * | 4/2012 | Wood et al. | 95/144 |
| 2011/0280660 A1 | 11/2011 | Bahukudumbi et al. | 405/63 |
| 2011/0296872 A1 | 12/2011 | Eisenberger | 62/640 |
| 2012/0076711 A1 | 3/2012 | Gebald et al. | 423/228 |
| 2013/0095996 A1 * | 4/2013 | Buelow et al. | 502/62 |
| 2014/0116250 A1 * | 5/2014 | Jiang et al. | 95/139 |

OTHER PUBLICATIONS

Yang, Ying et al., Preparation and Characterization of a Solid Amine Adsorbent for Capturing $CO_2$ by Grafting Allylamine onto PAN Fiber, PCFM Lab, OFCM Institute, School of Chemistry and Chemical Engineering, Sun Yat-Sen University, Guangzhou, Peop. Rep. China. *Langmuir* (2010), 26(17), 13897-13902. Publisher: American Chemical Society.

Bollini P. et al., Amine-Oxide Hybrid materials for Acid Separations, *J. Mater. Chem.*, 2011, 21, pp. 15100-15120.

* cited by examiner

SORBENT COMPOSITIONS, SORBENT ARTICLES, METHODS FOR PREPARING SORBENT ARTICLES, AND METHODS FOR CAPTURING TARGET GASES USING THE SORBENT ARTICLES

BACKGROUND

1. Field

The present specification generally relates to sorbent compositions for capturing or separating target gases from a gas stream and, more particularly, to sorbent compositions, sorbent articles, methods for preparing sorbent articles, and methods for capturing target gases using the sorbent articles.

2. Technical Background

Acidic gases are commonly produced by industrial processes as wastes or byproducts. Many such acidic gases are pollutants or have serious environmental impacts. For example, carbon dioxide ($CO_2$) is thought to be one of the primary sources for global warming, because it is believed to contribute strongly to the greenhouse effect. Other acidic gasses such as $H_2S$, $NO_x$, and $SO_x$, for example, may be poisonous or may contribute to environmental problems such as acid rain. Additionally, the acidic gases are inherently corrosive and may adversely affect pipelines and other apparatus used to transport gases during industrial processes. Examples of industrial processes that result in acidic gases include coal gasification, biomass gasification, steam reforming of hydrocarbons, and partial oxidation or separation of natural gas. For each of these processes, it is desirable to remove (scrub) or capture the acidic gases. When $CO_2$ is captured during natural gas processing, for example, not only does the $CO_2$ not become a pollutant or a contributor to global warming, but it also can be sold for use in other industries such as the beverage industry, the oil-recovery industry, and in other green-energy systems such as algae fixation.

Accordingly, ongoing needs exist for improved sorbent compositions, sorbent articles, methods for preparing sorbent articles, and methods for capturing target gases using the sorbent articles.

SUMMARY

According to various embodiments, articles for capturing or separating a target gas from a gas stream may include a porous substrate impregnated or coated with a sorbent composition. The sorbent composition may include a polyamine and a coexistent polymer chemically bonded to the polyamine. The coexistent polymer may include a polyurethane, a polyolefin-acrylic acid copolymer, or a combination thereof.

According to further embodiments, methods for preparing articles for capturing or separating a target gas from a gas stream may include applying an aqueous solution to a first porous substrate. The aqueous solution may include a polyamine and a coexistent polymer. The coexistent polymer may include a polyurethane, a polyolefin-acrylic acid copolymer, or a combination thereof. The methods for preparing the articles may further include drying the first porous substrate having the aqueous solution thereon to form a sorbent composition impregnated in or coated on the first porous substrate. The sorbent composition may be a reaction product of the polyamine and the coexistent polymer.

According to further embodiments, methods for capturing or separating a target gas from a gas stream may include flowing the gas stream through a porous substrate of an article. The porous substrate may be impregnated or coated with a sorbent composition including a polyamine and a coexistent polymer. The coexistent polymer may include a polyurethane, a polyolefin-acrylic acid copolymer, or a combination thereof.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
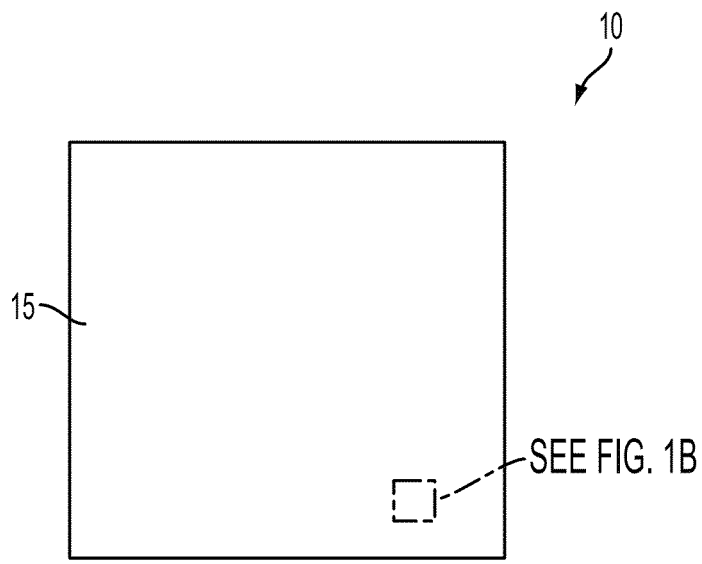
FIG. 1A is a plan view of an article for capturing or separating a target gas from a gas stream flowing through the article according to some embodiments described herein.

Reference will now be made in detail to embodiments of articles for capturing or separating a target gas from a gas stream. Exemplary embodiments of the articles are illustrated in the accompanying drawings. Whenever possible, the same reference numerals will be used throughout the drawing to refer to the same or like parts. Referring to FIG. 1A, an article 10 for capturing or separating a target gas from a gas stream may include a porous substrate 15 impregnated with a sorbent composition. The sorbent composition may include a polyamine and a coexistent polymer chemically bonded to the polyamine. The coexistent polymer may include a polyurethanes, a polyolefin-acrylic acid copolymer, or a combination thereof. The components of the articles will now be described in greater detail. Embodiments of methods for preparing the articles and methods of capturing or separating a target gas from a gas stream using the articles will be described below.

The articles for capturing or separating a target gas from a gas stream may include a porous substrate. The porous substrate may be any type of substrate with which the sorbent composition, to be described below, is chemically compatible and onto which the sorbent composition may be applied by methods such as coating or impregnation. In FIG. 1A, one exemplary embodiment of the article 10 is shown, in which the porous substrate 15 is a sheet or mat. The sheet or mat may be formed from a nonwoven material such as a nonwoven fabric or from a woven material. For example, the sheet or mat may be a nonwoven cellulosic material such as paper or tissue. As a further example, the sheet or mat may be made from nonwoven fibers of a polymer such as polypropylene. As still further examples, the sheet or mat may include carbon paper or a fabric or cloth containing activated carbon fibers.

Figure 1B:
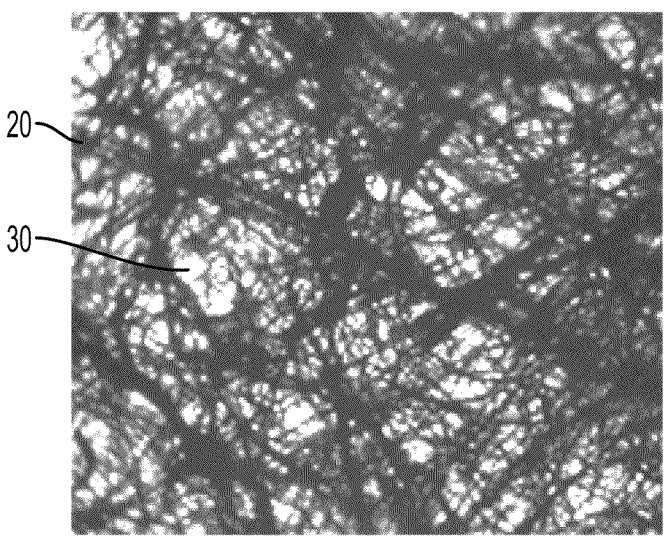
FIG. 1B is a magnification of a nonwoven fiber structure of the article of FIG. 1A.

Though the porous substrate 15 of FIG. 1A is a sheet or mat having a rectangular shape, it should be understood that other shapes may be possible, depending on how the porous substrate 15 will be configured in a system for removing the target gas, for example. A magnified portion of the porous substrate FIG. 1A (not to scale) is shown in FIG. 1B. When the porous substrate 15 is a sheet or mat, the porous substrate 15 may have a woven or nonwoven network of fibers 20 that define pores 30 through the porous substrate 15. In other embodiments, the porous substrate may be a porous ceramic material such as a honeycomb monolith having channels defined therethrough from opposite ends of the honeycomb monolith. In such embodiments, the honeycomb monolith may be made from any material that is chemically compatible with the sorbent composition and onto which the sorbent composition may be applied by methods such as coating or impregnation.

The porous substrate of the articles for capturing or separating a target gas from a gas stream may be impregnated or coated with a sorbent composition. In this regard, the sorbent composition may be physically held by or chemically bonded to the porous substrate. For example, the sorbent composition may be disposed within the pores of the porous substrate and be entrapped between or held in place by the material or fibers that define the pores. As another example, the sorbent composition may be disposed substantially on a surface of the porous substrate as a coating layer that may extend into the pores of the porous substrate. In some embodiments, the sorbent composition may be chemically bonded to the porous substrate. The sorbent composition may include chemical functional groups that form covalent bonds with functional groups of the material or fibers of the porous substrate. For example, the porous substrate may include surface hydroxyl groups to which portions of the sorbent compositions are capable of bonding. The sorbent composition may be disposed on or in the porous substrate in such a manner that, when the gas stream is flowed over or through the porous substrate, the gas stream comes into contact with the sorbent composition and the target gas can be adsorbed onto the sorbent composition.

The sorbent composition that is impregnated into or coated onto the porous substrate of the articles capturing or separating a target gas from a gas stream may include a polyamine and a coexistent polymer. The coexistent polymer may be chemically bonded to the polyamine. The weight ratio of the polyamine to the coexistent polymer may be from 1:100 to 100:1, from 1:10 to 10:1, from 1:5 to 5:1, from 1:2 to 2:1, from 1:1.5 to 1.5:1, or about 1:1, for example. In some embodiments, the polyethylenimine may be the major component by weight in the sorbent composition. In such embodiments, the weight ratio of the polyamine to the coexistent polymer may be from about 1:1 to about 50:1 or from about 1:1 to about 20:1 or from about 1:1 to about 10:1. In illustrative embodiments, the weight ratio of the polyamine to the coexistent polymer may be from about 2:1 to about 8:1, from about 3:1 to about 7:1, or from about 3:1 to about 6:1.

In general, when polyamines are used alone as a sorbent composition on a sorbent article or monolithic substrate for capturing target gases from a gas stream containing water (typically in the form of steam), over time the sorbent articles or monolithic substrates tend to lose effectiveness in capturing the target gas. Polyamines may be generally viscous, water-soluble polymers that can flow or be washed or leached off a sorbent article by the water in the gas stream. Polyamines also tend to be sensitive to oxygen and can degrade over time, assuming they are not washed or leached off the sorbent article before degrading. Thus, it is believed that lifetime and performance of efficiency of a sorbent article containing a polyamine may be increased if the sorbent article is coated or impregnated with a sorbent composition that is both chemically stable in oxygen and less soluble in water than a substantially insoluble in water. The sorbent compositions that include both the polyamine and the coexistent polymer are believed to meet these specifications. In some embodiments, for example, the sorbent composition may be substantially or completely insoluble in water.

The polyamine of the sorbent composition may be any water-soluble polyamine that can react with the coexistent polymer to form a sorbent composition that is less soluble in water than a similar composition containing only the polyamine. For example, the sorbent composition containing the polyamine and the coexistent polymer may be substantially water-insoluble, whereas a similar composition containing only the polyamine may have significant water solubility. In illustrative embodiments, the polyamine may be chosen from polyethylenimines, polyamidoamines, polyvinylamines, and alkylaminoalkoxysilanes. Examples of such compounds include, without limitation, tetraethylenepentamine, diethanolamine, diethylenetriamine, pentaethylenehexamine, tetraethylenepentamine-acrylonitrile, N-[(3-trimethoxysilyl)propyl]-ethylenediamine, N-[(3-trimethoxysilyl)propyl]-diethylenetriamine, polyaziridine, and combinations thereof. In some embodiments, the polyamine may be a polyethylenimine.

When the polyamine of the sorbent composition is a polyethylenmine, the polyethylenimines may include any polymers built from monomers of the general formula —$(CH_2CH_2NH)$—. The polyethylenimines may include linear polyethylenimines, branched polyethylenimines, dendritic polyethylenimines, or combinations thereof. Polyethylenimines in general may include primary amine groups, secondary amine groups, and tertiary amine groups. Primary amine groups (—$NH_2$) are present at ends of the polyethylenimine molecules, secondary amine groups (e.g., —$CH_2CH_2NHCH_2CH_2$) are present throughout the chains of the polyethylenimine molecules. Tertiary amine groups are present only at branch points of branched or dendritic polyethylenimine molecules, at which one nitrogen atom is bonded to three —$CH_2CH_2$— groups. Polyethylenimines in the sorbent composition may have weight-average molecular weight of from about 600 Dalton to about 15,000 Dalton. In non-limiting. illustrative embodiments, the polyethylenimines of the sorbent composition may have weight-average molecular weight of from about 2,000 Dalton to about 5,000 Dalton.

The coexistent polymer may include a polyurethane, a polyolefin-acrylic acid copolymer, or a combination thereof. The coexistent polymer may be a chemically bonded to the polyamine or may be present together with the polyamine in the sorbent composition in such a manner that one or more properties of the combination of the polyamine and the coexistent polymer are improved over the same properties of the polyamine alone. For example, the combination of the polyamine and the coexistent polymer, compared to the polyamine alone, may exhibit less solubility in water, reduced sensitivity to oxygen, higher stability at elevated temperatures such as in the range of 200° C. to 400° C., greater uniformity in coating or impregnation into the porous substrate, higher capacity for removing the target gas from the gas stream, increased lifetime, or any combination thereof. It should be understood that, when the coexistent polymer is chemically bonded to the polyamine, one or more covalent bonds may be formed between the polyamine and the coexistent polymer, such that the chemical structure of the combined species no longer match a defined formula for the separate polyamine, the coexistent polymer, or both. Despite this, a sorbent composition shall be understood to contain a polyamine and a coexistent polymer even if sorbent composition consists of or consists essentially of a reaction product of the polyamine and the coexistent polymer that retains as moieties the basic molecular structures of the polyamine and the coexistent polymer, except for the structures that are altered through the reaction or covalent bonding of the polyamine to the coexistent polymer.

In some embodiments, the coexistent polymer may include a polyurethane. In general, polyurethanes include polymers with molecular units linked together by urethane groups of the formula —(NH—(C=O)—O)—. In some embodiments, the polyurethane may be any such polyurethane compound that, when combined with a polyamide (described above) in the sorbent composition, the combination of the polyamide and the polyurethane forms a sorbent composition that is significantly less water-soluble than a composition containing only the polyamine and also is retained favorably on or in the porous substrate. In some embodiments, the sorbent composition may be substantially water insoluble. The polyurethane of the sorbent composition according to embodiments herein may be derived from an isocyanate compound such as a di-isocyanate compound or a multi-isocyanate compound that reacts to form the polyurethane in the presence of the polyamine. An isocyanate compound may react with water, an alcohol, or a hydroxyl functionality to form a carbamate, as shown in Reaction 1:

(Reaction 1)

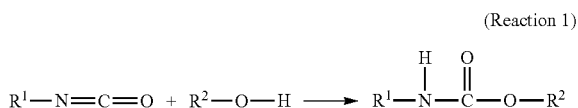

In Reaction 1, group $R^1$ may be any aliphatic or aromatic group, and group $R^2$ may be hydrogen or any aliphatic or aromatic group. The carbamate may react further with other carbamates to form the polyurethane. In some embodiments, the sorbent composition may be applied to the porous substrate by coating the porous substrate with an aqueous solution containing the polyurethane. Without intent to be bound by theory, it is believed that the aqueous solution of the polyurethane may contain residual isocyanate groups that can react with surface hydroxyl-group functionalities that may be present on the porous substrate, such as on fibers of the porous substrate, for example, to form urethane linkages between the polyurethane and the porous substrate. Thus, in some embodiments, the polyurethane of the sorbent composition may be chemically bonded to the porous substrate.

Isocyanate groups of isocyanate compounds also react with amine groups to form urea linkages, as shown in Reaction 2, in which a urea linkage is circled:

(Reaction 2)

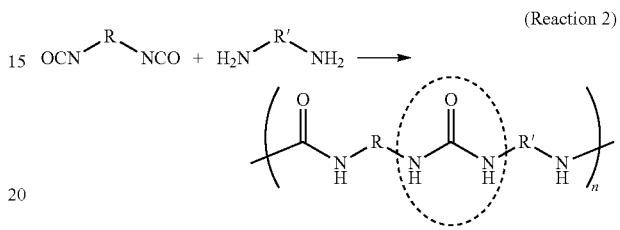

In Reaction 2, groups R and R' may be any aliphatic or aromatic group. The urea linkage circled in the product has a first nitrogen atom derived from an isocyanate group of a di-isocyanate compound and a second nitrogen atom derived from a primary amine. Though Reaction 2 shows the reaction of a di-isocyanate with a primary amine, it should be understood that urea linkages also may form by an analogous reaction of an isocyanate compound with a compound having a secondary amine. Thus, in embodiments in which the sorbent composition is applied to the porous substrate as an aqueous solution containing a polyurethane and a polyamine such as a polyethylenimine, isocyanate groups in the aqueous solution may react with primary amines of the polyamine, secondary amines of the polyamine, or both. Thereby, in the sorbent composition on the porous substrate, the polyurethane may be chemically bonded to the polyamine through urea linkages. In such embodiments, the resulting sorbent composition may be consistent in chemical structure with that of a copolymer such as a poly(urethane-urea). In additional embodiments, the polyurethane may be chemically bonded to the polyamine through urea linkages and may also be chemically bonded to the porous substrate, such as by urethane linkages as described above, for example.

In some embodiments, the coexistent polymer may include a polyolefin-acrylic acid copolymer. In some embodiments, the polyolefin-acrylic acid copolymer may be any polyolefin-acrylic acid copolymer that, when combined with a polyamide (described above) in the sorbent composition, the combination of the polyamide and the polyolefin-acrylic acid copolymer forms a sorbent composition that is less water-soluble than a similar composition containing only the polyamine and also is retained favorably on or in the porous substrate. In some embodiments, the sorbent composition may be substantially insoluble in water. In non-limiting illustrative embodiments, the polyolefin component of the polyolefin-acrylic acid copolymer may be a polyethylene, a polypropylene, or a polybutylene, for example. As used herein, the term "polyolefin-acrylic acid copolymer" includes copolymers in which the acrylic acid moieties are acrylic acid or acrylic acid salts. For example, the polyolefin-acrylic acid copolymer may be a polyethylene-acrylic acid copolymer or a copolymer of polyethylene and an acrylic acid salt. In a non-limiting illustrative embodiment, the polyolefin-acrylic acid copolymer may be a copolymer of polyethylene and acrylic acid ammonium salt. Exemplary polyethylene-acrylic acid copolymers may have general formula (I):

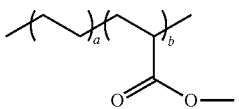
(I)

In general formula (I), the subscript a refers to polyethylene moieties and the subscript b refers to the acrylic acid moieties. In exemplary embodiments, the ratio of a to b in formula (I) may be from 1:20 to 20:1, from 1:10 to 10:1, from 1:5 to 5:1, from 1:2 to 2:1, or about 1:1, for example. In illustrative embodiments, a may be greater than or equal to b, such that the ratio of a to b in may be from 1:1 to 20:1, from 1:1 to 10:1, from 1:1 to 5:1, or from 1:1 to 2:1. In one exemplary embodiment, ratio of a to b in may be about 5:1, such that the polyethylene-acrylic acid copolymer may contain about 20 mol. % acrylic acid moiety and about 80 mol. % polyethylene moieties.

In some embodiments, within the sorbent composition on the porous substrate, the polyolefin-acrylic acid copolymer may be chemically bonded to the polyamine, to the porous substrate, or to both. In some embodiments, the polyolefin-acrylic acid copolymer may be mixed with the polyamine in aqueous solution that is applied to the porous substrate and dried to form the sorbent composition. When the sorbent composition is applied to the porous substrate in this manner, the acrylic acid groups may react with the polyamine so that the polyolefin-acrylic acid copolymer is chemically bonded to the polyamine in the sorbent composition. Without intent to be bound by theory, it is believed that the reaction of the polyolefin-acrylic acid copolymer with the polyamine may occur by an ion-exchange reaction as in Reaction 3 below or by an acid-base reaction as in Reaction 4 below:

  (Reaction 3)

  (Reaction 4)

Though in Reaction 3, the reaction of a carboxyl group of an acrylic acid moiety is depicted as an ammonium salt, it should be understood that other salts of acrylic acid may produce an analogous reaction.

In addition to reacting with the polyamine component of the sorbent composition, the polyolefin-acrylic acid copolymer may also react with the porous substrate, particularly when the porous substrate include surface functionalities such as hydroxyl groups. Without intent to be bound by theory, it is believed that the reaction of the polyolefin-acrylic acid copolymer with hydroxyl surface functionalities of the porous substrate may occur by an ion-exchange reaction as in Reaction 5 below or by an acid-base reaction as in Reaction 6 below:

  (Reaction 5)

  (Reaction 6)

In some embodiments, the coexistent polymer may include a combination of a polyurethane and a polyolefin-acrylic acid copolymer. In such embodiments, the polyurethane and the polyolefin-acrylic acid copolymer may be selected from any of the polyurethanes and polyolefin-acrylic acid copolymers described above. When both a polyurethane and a polyolefin-acrylic acid copolymer are present, the weight ratio of the polyurethane to the polyolefin-acrylic acid may be from 1:100 to 100:1, from 1:10 to 10:1, from 1:5 to 5:1, from 1:2 to 2:1, from 1:1.5 to 1.5:1, or about 1:1, for example.

Figure 2A:
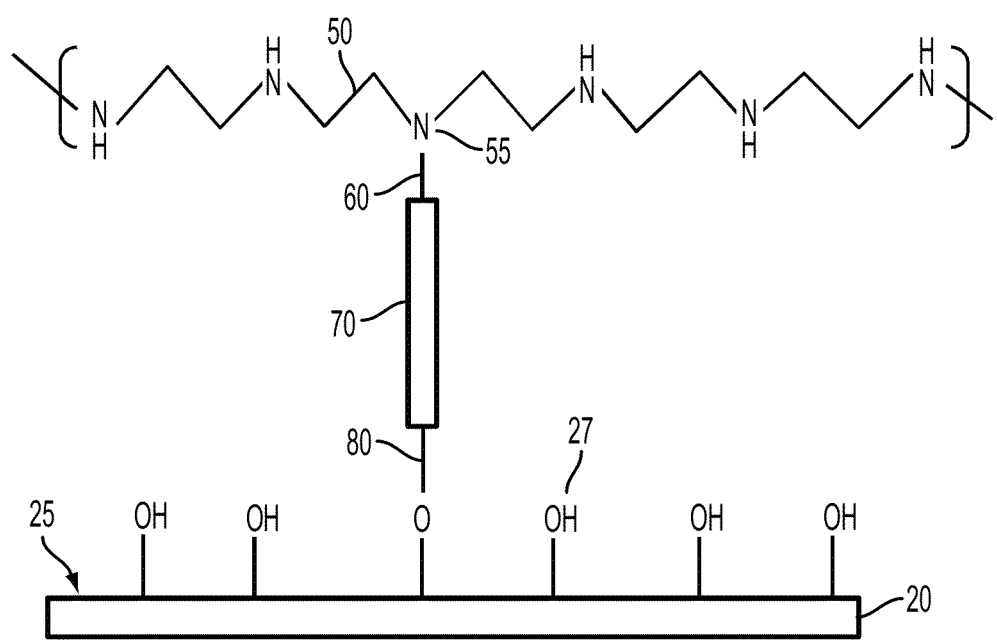
FIG. 2A is a schematic diagram of bonding of a sorbent composition according to some embodiments, in which coexistent polymer is bonded to a porous substrate and a secondary amino group of a polyethylenimine.
Figure 2B:
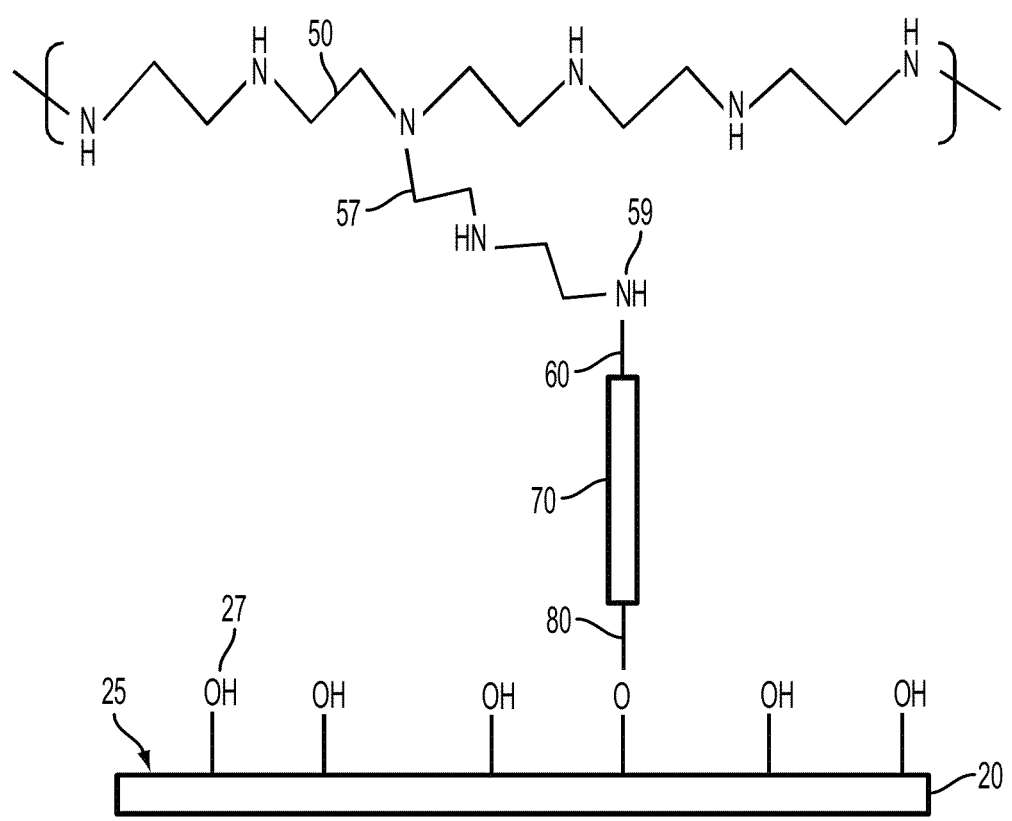
FIG. 2B is a schematic diagram of bonding of a sorbent composition according to some embodiments, in which coexistent polymer is bonded to a porous substrate and a primary amino group of a polyethylenimine.

Exemplary microstructure of the sorbent articles according to some embodiments described above are depicted in FIGS. 2A and 2B. In FIG. 2A, the porous substrate 20 (for example, a fiber of the porous substrate 20) has a substrate surface 25 with hydroxyl surface functionalities 27 thereon. A secondary-amine nitrogen 55 of a polyamine 50 is bonded to a coexistent polymer 70 through a first linkage 60. If the coexistent polymer 70 is a polyurethane, for example, the first linkage 60 may be a urea linkage. The coexistent polymer 70 is also bonded to a hydroxyl surface functionality 27 through a second linkage 80. It should be understood that the polyamine 50 of FIG. 2A is shown as a linear polyethylenimine for illustrative purposes only and that the polyamine need not be a polyethylenimine, much less a linear polyethylenimine. In FIG. 2B, the porous substrate 20 has a substrate surface 25 with hydroxyl surface functionalities 27 thereon. A primary-amine nitrogen 59 at the end of a polymer branch 57 of a polyamine 50 is bonded to a coexistent polymer 70 through a first linkage 60. If the coexistent polymer 70 is a polyurethane, for example, the first linkage 60 may be a urea linkage, such that the sorbent composition may be consistent in chemical structure with a copolymer such as a poly(urethane-urea). The coexistent polymer 70 may also be bonded to a hydroxyl surface functionality 27 through a second linkage 80. It should be understood that the polyamine 50 of FIG. 2A is shown as a branched polyethylenimine for illustrative purposes only and that the polyamine need not be a polyethylenimine, much less a branched polyethylenimine.

Figure 3A:
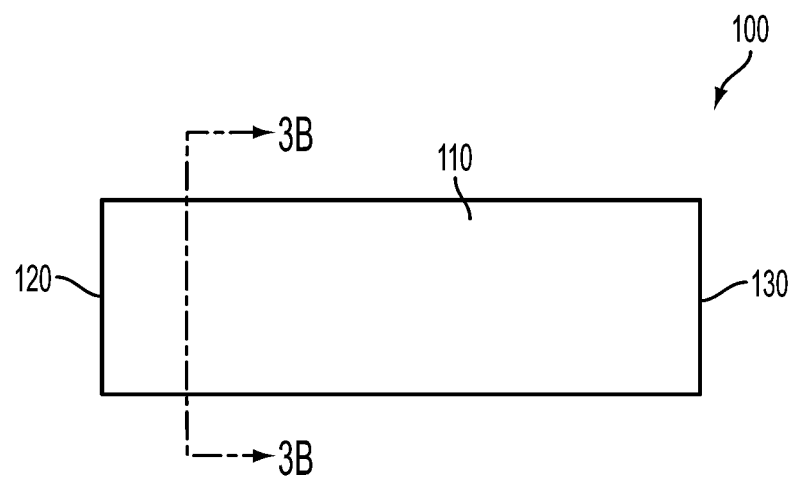
FIG. 3A is a front plan view of an exemplary tubular sorbent article according to illustrative embodiments described herein.
Figure 3B:
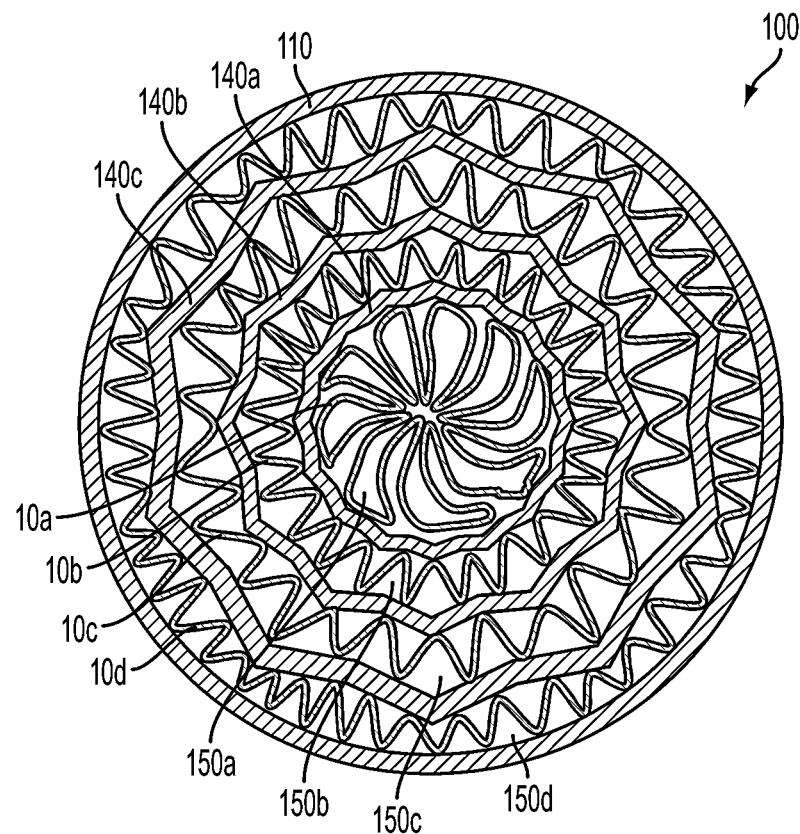
FIG. 3B is a cross-sectional view of the exemplary tubular sorbent article of FIG. 3A.

Referring to FIGS. 3A and 3B, one or more articles according to embodiments described above may be configured as or incorporated into a sorbent article that may be placed into a gas stream to separate, capture, or remove a target gas from the gas stream. In FIG. 3A, a sorbent article 100 with an inlet end 120 and an outlet end 130 is shown. The sorbent article 100 includes an outer shell 110. A gas stream may be introduced into the inlet end 120 and flowed through the sorbent article 100 to the outlet end 130. While the gas stream is inside the sorbent article 100, target gas present in the gas stream may be captured by sorbent composition on one or more articles inside the sorbent article 100. The cross-section view of the sorbent article 100 in FIG. 3B provides a non-limiting illustrative embodiment of incorporation of multiple articles 10a, 10b, 10c, 10d into the sorbent article 100. Each of the multiple articles 10a, 10b, 10c, 10d may be an article according to embodiments described above, which may include a porous substrate such as a sheet or a mat. The porous substrate then may be bent or folded in such a manner that flow channels 150a, 150b, 150c, 150d are defined through the sorbent article 100 from the inlet end 120 to the outlet end 130 of the sorbent article 100. In FIG. 3B, the shapes of the flow channels 150a, 150b, 150c, 150d are intentionally exaggerated for illustrative purposes only. It should be understood that effective flow channels may be obtained by other configurations such as by wrapping the multiple articles 10a, 10b, 10c, 10d tightly in any manner that permits flow of the gas stream through the sorbent article 100 and allows the gas stream to be in fluidic communication with sorbent composition on the multiple articles 10a, 10b, 10c, 10d. Additionally, to maintain structural integrity of the sorbent article 100 and/or to maximize fluidic communication between the sorbent composition and the target gas, separator sheets 140a, 140b, 140c may be included in the sorbent article 100 between each of the multiple articles 10a, 10b, 10c, 10d. The separator sheets 140a, 140b, 140c may be any material that is compatible with the temperature and pressure conditions to which the sorbent article 100 will be subjected during use. In some examples, the separator sheets 140a, 140b, 140c may be made from a flexible material such as paper or from a rigid material such as a metal or a plastic.

The articles according to embodiments described above, whether used alone, as components of sorbent articles such as those depicted in FIGS. 3A-3B, or in an appropriate system including one or more of the articles or sorbent articles, may be suitable for capturing or separating a target gas from a gas stream. The gas stream may be derived from any small-scale or industrial process that generate target gases that are desired to be captured or separated from the gas stream. Non-limiting examples of gas streams may include flue gas, natural gas, gas coal gasification products, biomass gasification products, and products of hydrocarbon reforming processes. It is believed that the articles according to embodiments described above may be particularly well suited for separating, capturing, or removing acidic gases from gas streams. Thus, in some embodiments the target gas may be an acidic gas or a mixture of acidic gases. In non-limiting illustrative embodiments, the target gas may be an acidic gas such as hydrogen sulfide, carbon dioxide, carbon disulfide, nitric oxide, nitrogen dioxide, sulfur dioxide, sulfur trioxide, mercaptans, or mixtures thereof. For example, the target gas may be carbon dioxide that is present in a gas stream derived from flue gas or natural gas.

Articles for capturing or separating a target gas from a gas stream have been described above. Methods for preparing the articles according to one or more embodiments above will now be described.

In some embodiments, methods for preparing an article for capturing or separating a target gas from a gas stream may include applying an aqueous solution to a first porous substrate. The aqueous solution may include a polyamine and a coexistent polymer or precursor compounds to the polyamine and the coexistent polymer that react to form a sorbent composition including the polyamine and the coexistent polymer. The polyamine may be any water-soluble polyamine such as polyethylenimines, polyamidoamines, polyvinylamines, and alkylaminoalkoxysilanes. Examples of such compounds include, without limitation, tetraethylenepentamine, diethanolamine, diethylenetriamine, pentaethylenehexamine, tetraethylenepentamine-acrylonitrile, N-[(3-trimethoxysilyl)propyl]-ethylenediamine, N-[(3-trimethoxysilyl)propyl] diethylenetriamine, polyaziridine, and combinations thereof. In some embodiments, the polyamine may be a polyethylenimine. The coexistent polymer may include a polyurethane, polyolefin-acrylic acid copolymer, a precursor to a polyurethane such as an isocyanate, or any combination thereof. Suitable polyurethanes and polyolefin-acrylic acid copolymers have been described above with respect to embodiments of the articles described above.

In some embodiments, the aqueous solution may contain any weight ratio of polyamine to coexistent copolymer that produces a stable mixture at room temperature with properties such as viscosity that enable the aqueous solution to be easily applied to the porous substrate and produce a substantially uniform layer of sorbent composition on the porous substrate. In illustrative embodiments, the aqueous solution may contain polyamine and coexistent polymer in a weight ratio of about 1 to 10 parts by weight polyamine to 1 part by weight coexistent polymer. With lower weight ratios of polyamine to coexistent polymer such as about 1:1, for example, the aqueous solution may become gelatinous after about 24 hours. Even so, aqueous solutions near the 1:1 weight ratio may still be suitable for application to the porous substrate, particularly if they are applied to the porous substrate soon after preparation of the aqueous solution. The total solids content of the aqueous solution also may be chosen to facilitate uniform coating or impregnation into the porous substrate. In illustrative embodiments, the aqueous solution may have a total solids content of from about 5% to about 50%, such as from about 10% to about 30%, or about 20%, for example.

The methods for preparing an article for capturing or separating a target gas from a gas stream may include may include drying the first porous substrate having the aqueous solution thereon to form a sorbent composition impregnated in the first porous substrate or coated onto the first porous substrate that is a reaction product of the polyamine and the coexistent polymer. For example, if the polyamine is a polyethylenimine and the coexistent polymer is a polyurethane, the sorbent composition may contain a copolymer such as a poly(urethane-urea). Without intent to be bound by theory, it is believed that the drying of the porous substrate by removal of water from the aqueous solution, for example, allows the polymers present in the aqueous solution to react with each other, with the porous substrate, or both, to form a sorbent composition that is less soluble in water than a similar composition containing only the polyamine or may be substantially water-insoluble. Reaction of the polymers have been described above and have been illustrated with reference to FIGS. 2A and 2B.

In some embodiments, the methods for preparing an article for capturing or separating a target gas from a gas stream may also include applying the aqueous solution to at least one additional porous substrate; drying each additional porous substrate having the aqueous solution thereon; and stacking the additional porous substrates over the first porous substrate to form a stacked article. Such embodiments may also further include stacking the additional porous substrates. The stacking of the additional porous substrates may also include providing at least one spacer sheet between adjacent porous substrates. The at least one spacer sheet may be any article such as a paper, fabric, or sheet, that separates adjacent porous substrates in the sorbent article, facilitates gas flow through the sorbent article, or provides rigidity to the sorbent article. Optionally, the methods may further include shaping the stacked article to form a tubular sorbent article. The sorbent article 100 of FIGS. 3A and 3B, described above, is illustrative of a non-limiting embodiment of an article prepared according to methods including shaping the stacked article. Such methods may also include folding or bending the porous substrates before the shaping to maximize surface area exposed to the gas stream when the gas stream flows through the tubular sorbent article. In the sorbent article 100 of FIGS. 3A and 3B, the folding or bending is illustrated for each of the multiple articles 10a, 10b, 10c, 10d that are bent to define flow channels 150a, 150b, 150c, 150d.

The articles for capturing or separating a target gas from a gas stream according to embodiments described above, including articles prepared according to embodiments of methods described above, may be used to capture or separate a target gas from a gas stream. Methods for capturing or separating a target gas from a gas stream using one or more of the articles described above will now be described.

The methods for capturing or separating a target gas from a gas stream may include flowing the gas stream through a porous substrate of an article. The flowing of the target gas may be conducted at room temperature or at an elevated temperature such as from about 100° C. to about 400° C., for example. The porous substrate may be impregnated with a sorbent composition that includes a polyamine and a coexistent polymer. The polyamine may be any water-soluble polyamine such as polyethylenimines, polyamidoamines, polyvinylamines, and alkylaminoalkoxysilanes. Examples of such compounds include, without limitation, tetraethylenepentamine, diethanolamine, diethylenetriamine, pentaethylenehexamine, tetraethylenepentamine-acrylonitrile, N-[(3-trimethoxysilyl)propyl]-ethylenediamine, N-[(3-trimethoxysilyl)propyl]diethylenetriamine, polyaziridine, and combinations thereof. In some embodiments, the polyamine may be a polyethylenimine. The coexistent polymer may include a polyurethane, polyolefin-acrylic acid copolymer, a precursor to a polyurethane such as an isocyanate, or any combination thereof. Suitable polyurethanes and polyolefin-acrylic acid copolymers have been described above with respect to embodiments of the articles described above.

In the methods for capturing or separating a target gas from a gas stream, in some embodiments the article may be a single porous substrate such as a sheet or a mat, such that the gas stream is flowed directly through the surface of the porous substrate. In other embodiments, the article may be a sorbent article such as the sorbent article 100 of FIGS. 3A and 3B that include multiple porous substrates (articles 10a, 10b, 10c, 10d), optionally separated by separator sheets 140a, 140b, 140c. When the sorbent article 100 of FIGS. 3A and 3B is used, for example, the gas stream may be flowed through the sorbent article 100 from the inlet end 120 to the outlet end 130 by placing the inlet end 120 in fluidic communication with a source (not shown) to the gas stream and with an exhaust (not shown) that receives the portion of the gas stream from which the target gas has been captured or separated.

In the methods for capturing or separating a target gas from a gas stream, the gas stream may be derived from any small-scale or industrial process that generate target gases that are desired to be captured or separated from the gas stream. Non-limiting examples of gas streams may include flue gas, natural gas, gas coal gasification products, biomass gasification products, and products of hydrocarbon reforming processes. It is believed that the articles according to embodiments described above may be particularly well suited for separating, capturing, or removing acidic gases from gas streams. Thus, in some embodiments the target gas may be an acidic gas or a mixture of acidic gases. In non-limiting illustrative embodiments, the target gas may be an acidic gas such as hydrogen sulfide, carbon dioxide, carbon disulfide, nitric oxide, nitrogen dioxide, sulfur dioxide, sulfur trioxide, mercaptans, or mixtures thereof. For example, the target gas may be carbon dioxide that is present in a gas stream derived from flue gas or natural gas.

The methods for capturing or separating a target gas from a gas stream may further include heating the article to a temperature sufficient to desorb the target gas that has adsorbed onto the sorbent composition. The target gas desorbed in this manner may be routed to a suitable collection system or vessel for storing or reusing the target gas. For example, if the target gas is carbon dioxide, the desorbed target gas may be routed to a pressurized storage vessel or to a condensation apparatus to form commercially useful products such as pressurized carbon dioxide or dry ice.

EXAMPLES

The embodiments described above will be further clarified by the following examples.

Example 1

Loading of Sorbent Compositions onto Porous Substrates

A first substrate was coated with a polymer solution containing a polyethylenimine (PEI) and a poly(ethylene-co-acrylic acid). To prepare the polymer solution, a PEI with a weight-average molecular weight of about 10,000 Dalton (Aldrich) and MP4983 (a poly(ethylene-co-acrylic acid) ammonium salt with 20 mol. % acrylic acid moiety, available from Michelman) were mixed with water to form an aqueous solution having a solids content of about 20 wt. %. The mass ratio of the PEI to the MP4983 in the aqueous solution was about 4:1. The aqueous solution was loaded onto a porous substrate of Pig Mat (a nonwoven mat of polypropylene fibers, available from New Pig), and the substrate was dried at room temperature overnight. The mass of the dried loaded substrate indicated a polymer loading of about 100 wt. % based on the mass of the substrate before coating.

As a basis for comparison, a second substrate was coated with an aqueous solution of PEI alone. Equal volumes of a polyethylenimine (PEI) and water were thoroughly mixed in a beaker to form an aqueous solution containing about 20 wt. % PEI. This solution was applied onto Pig Mat such that the mass of the PEI solution to the substrate was about 5:1. The aqueous solution was loaded onto a porous substrate of Pig Mat and the substrate was dried at room temperature overnight. The mass of the dried loaded substrate indicated a polymer loading of about 100 wt. % based on the mass of the substrate before coating.

Example 2

Making the Sorbent Article for Carbon Dioxide Capturing Test

Onto each of the substrates prepared in Example 1, a piece of spacer sheet was stacked. The resulting stacked sheets were rolled into a sorbent article with a diameter of 2.5 cm and a length of 10 cm. The sorbent articles were wrapped with a paper to serve as the as a shell. This resulted in the finished sorbent article ready for $CO_2$ adsorption testing.

Example 3

Carbon Dioxide Adsorption Test

Adsorption measurements were performed using a stainless steel tubular reactor with a 1-inch (2.74-cm) diameter glass insert. The inlet gas composition was about 9 vol. % to 10 vol. % $CO_2$ balanced with nitrogen. The tests were conducted at a flow rate of about 500 cc/min for an adsorption cycle, during which temperatures at both the inlet and outlet of the sorbent article were precisely monitored. The sorbent articles were degassed at about 85° C. for an hour and then cooled to room temperature before the adsorption cycles were started. Gas analyses in the inlet and outlet gas streams were performed using a 560 Nicolet Gas Fourier Transform Infrared Spectroscopy (FTIR) equipped with an MCT detector and integrated with an MKS Type 250E pressure/flow controller monitored at 4 $cm^{-1}$ resolution. The amount of $CO_2$ adsorbed onto the sorbent article was obtained by integration of the area under the curve of the adsorbed $CO_2$ upon breakthrough.

Figure 4:
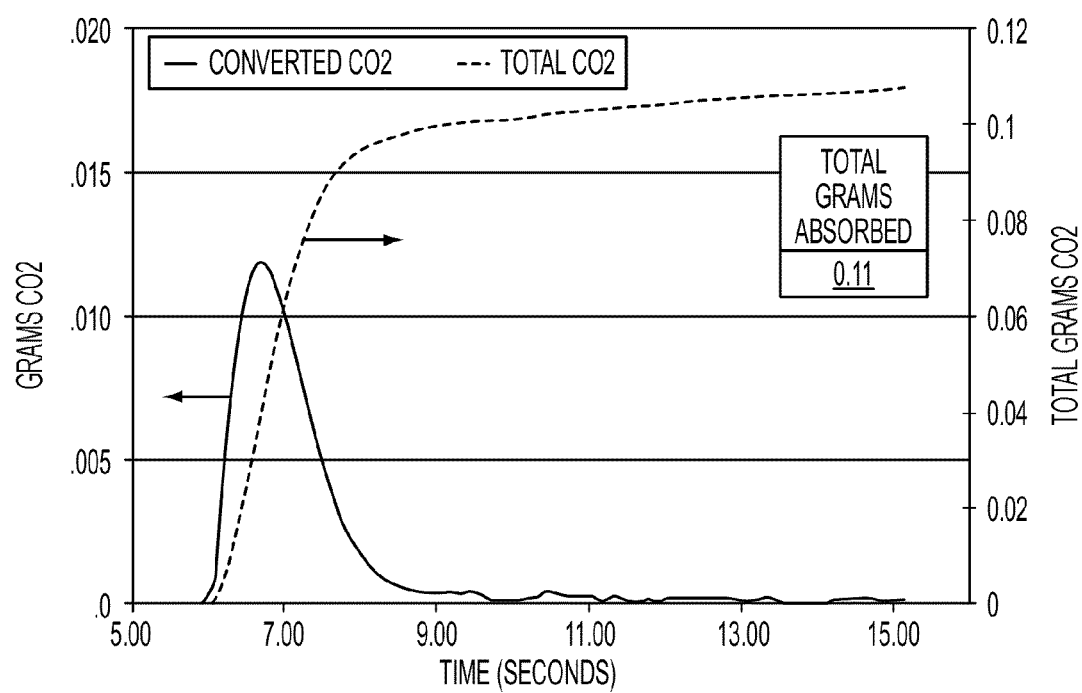
FIG. 4 is a graph of carbon dioxide adsorption as a function of time for a sorbent article according to an illustrative embodiment herein, the sorbent article having a porous substrate loaded with a polyethylenimine and a copolymer of ethylene and acrylic acid ammonium salt.
Figure 5:
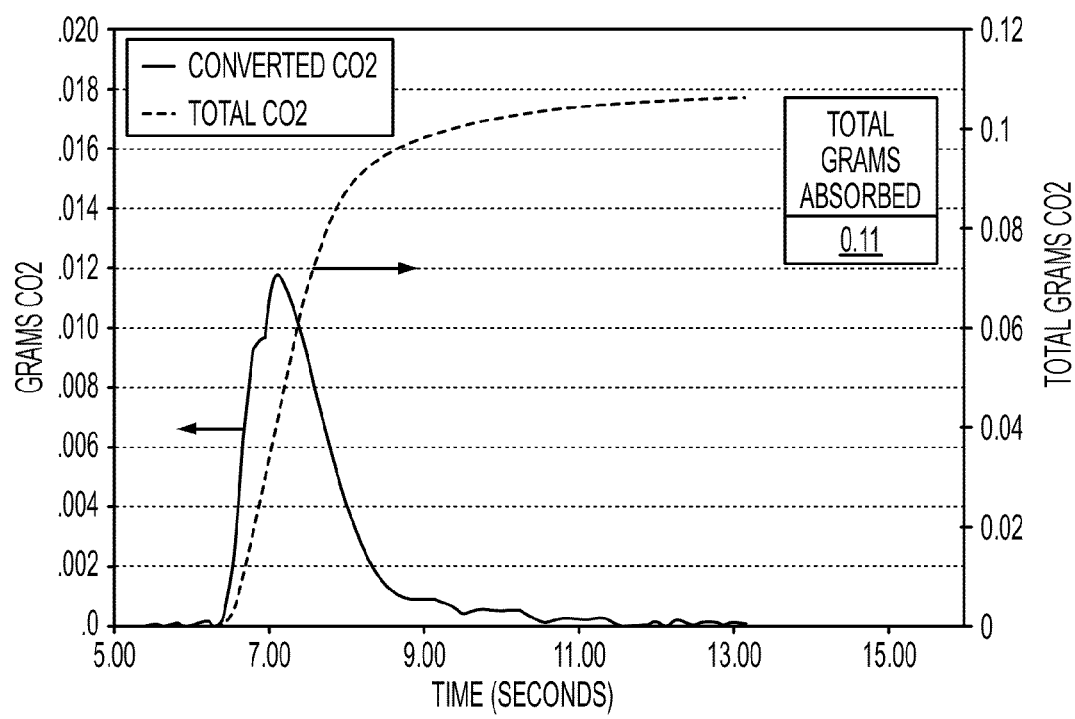
FIG. 5 is a graph of carbon dioxide adsorption as a function of time for a sorbent article having a porous substrate loaded only a polyethylenimine and prepared as a basis for comparison with the data of FIG. 4.

Results obtained from the first substrate loaded with PEI/MP4983 are provided in FIG. 4, and results obtained from the second substrate loaded with PEI alone are provided in FIG. 5. The results show that the PEI/MP4983 loaded sorbent article had a capacity comparable to the pure PEI loaded sorbent article, in that both sorbent articles absorbed 0.11 g $CO_2$, equivalent to about 2.4 g/L and about 0.21 mmol/g PEI. A repeat run of the PEI/MP4983 loaded sorbent article showed the same result as the first run.

The PEI/MP4983 sorbent article was retested after one year. In this test, the PEI/MP4983 sample was found to retain its original capacity for $CO_2$ capture. Specifically, the sorbent article was found after the one year to adsorb 0.12 g $CO_2$, comparable to the 0.11 g $CO_2$ measured initially. Thus, the one-year data demonstrate the PEI in the tested sample did not degrade with the time when used in combination with the MP4983. Identical results were observed after one year in comparing sorbent articles prepared and tested according to Examples 1 and 2 above but using a cellulosic material (Kim Wipe, available from Kimberley-Clark) as the porous substrate.

Thus, articles for capturing or separating a target gas from a gas stream, methods for preparing the articles, and methods for capturing or separating a target gas from a gas stream using the articles have been described. The articles include a porous substrate coated or impregnated with a sorbent composition formed from a polyamine and a coexistent polymer selected from polyurethanes, polyolefin-acrylic acid copolymers, or combinations thereof. The sorbent compositions on the articles have reduced solubility in water compared to similar compositions containing only a polyamine and, therefore, exhibit durability and longevity exceeding that of sorbent articles including polyamines without a coexistent polymer according to embodiments herein. In some embodiments, the sorbent compositions may be substantially insoluble in water. Additionally, the articles described herein may be based on low-cost porous substrates and flexible substrates such as cellulosic materials or polypropylene mats, for example. The sorbent compositions are less sensitive to oxygen than polyamines yet still exhibit comparable ability to capture acidic target gases such as carbon dioxide from a gas stream. Particularly when flexible substrates such as sheets or mats are used as the porous substrate, manufacturing complexities inherent with sorbent-coated ceramic monoliths are avoided, as are the costs associated therewith.

In a first aspect, the disclosure provides articles for capturing or separating a target gas from a gas stream. The articles may include a porous substrate impregnated or coated with a sorbent composition. The sorbent composition may include a polyamine and a coexistent polymer chemically bonded to the polyamine. The coexistent polymer may be chosen from polyurethanes, polyolefin-acrylic acid copolymers, and combinations thereof.

In a second aspect, the disclosure provides an article according to the first aspect, in which the polyamine is chosen from polyethylenimines, polyamidoamines, polyvinylamines, alkylaminoalkoxysilanes, tetraethylenepentamine, diethanolamine, diethylenetriamine, pentaethylenehexamine, tetraethylenepentamine-acrylonitrile, N-[(3-trimethoxysilyl)propyl]-ethylenediamine, N-[(3-trimethoxysilyl)propyl]-diethylenetriamine, polyaziridine, and combinations thereof.

In a third aspect, the disclosure provides an article according to the first or the second aspect, in which the polyamine includes a polyethylenimine or is a polyethylenimine.

In a fourth aspect, the disclosure provides an article according to any of the preceding aspects, in which the polyolefin-acrylic acid copolymers are selected from copolymers of ethylene and acrylic acid and copolymers of ethylene and acrylic acid salts.

In a fifth aspect, the disclosure provides an article according to any of the preceding aspects, in which the polyolefin-acrylic acid copolymers include a copolymer of ethylene and acrylic acid ammonium salt.

In a sixth aspect, the disclosure provides an article according to any of the preceding aspects, in which the coexistent polymer includes a polyolefin-acrylic acid copolymer and the polyolefin-acrylic acid copolymer or the coexistent polymer includes a copolymer of ethylene and acrylic acid ammonium salt or is a copolymer of ethylene and acrylic acid ammonium salt.

In a seventh aspect, the disclosure provides an article according to any of the preceding aspects, in which the coexistent polymer includes a polyurethane.

In an eighth aspect, the disclosure provides an article according to any of the preceding aspects, in which the porous substrate includes a nonwoven or woven sheet or mat containing fibers chosen from cellulosic materials, polypropylene, carbon, or activated carbon.

In a ninth aspect, the disclosure provides an article according to any of the preceding aspects, in which the porous substrate is a nonwoven fabric.

In a tenth aspect, the disclosure provides an article according to any of the first through ninth aspects, in which the porous substrate is a fabric of polypropylene fibers.

In an eleventh aspect, the disclosure provides an article according to any of the preceding aspects, in which the coexistent polymer is chemically bonded to both the polyamine and the porous substrate.

In a twelfth aspect, the disclosure provides an article according to any of the preceding aspects, in which the polyamine includes a polyethylenimine, the coexistent polymer includes a polyurethane, and the polyethylenimine is chemically bonded to the polyurethane through urea linkages.

In a thirteenth aspect, the disclosure provides an article according to any of the preceding aspects, in which the polyamine includes a polyethylenimine; the coexistent polymer includes a polyurethane, the polyethylenimine is chemically bonded to the polyurethane through urea linkages, and the polyurethane is chemically bonded to surface functionalities of the porous substrate.

In a fourteenth aspect, the disclosure provides an article according to any of the preceding aspects, in which the porous substrate is a cellulosic material and the surface functionalities are hydroxyl groups of the cellulosic material.

In a fifteenth aspect, the disclosure provides an article according to any of the preceding aspects, in which the target gas is chosen from hydrogen sulfide, carbon dioxide, carbon disulfide, nitric oxide, nitrogen dioxide, sulfur dioxide, sulfur trioxide, mercaptans, or mixtures thereof.

In a sixteenth aspect, the disclosure provides an article according to any of the preceding aspects, in which the gas stream is chosen from flue gas, natural gas, gas coal gasification products, biomass gasification products, and hydrocarbon reforming products.

In a seventeenth aspect, the disclosure provides an article according to any of the first through third and seventh through sixteenth aspects, in which the polyamine includes a polyethylenimine having a weight-average molecular weight of from about 600 Dalton to about 15,000 Dalton.

In an eighteenth aspect, the disclosure provides an article according to the seventeenth aspect, in which the polyamine includes a polyethylenimine having a weight-average molecular weight of from about 2000 Dalton to about 5000 Dalton.

In a nineteenth aspect, the disclosure provides an article according to the seventeenth or eighteenth aspect, in which the weight ratio of the polyethylenimine to the coexistent polymer in the sorbent composition is from about 1:1 to about 10:1.

In a twentieth aspect, the disclosure provides an article according to any of the preceding aspects, in which the sorbent composition is substantially water insoluble.

In a twenty-first aspect, the disclosure provides methods for preparing an article for capturing or separating a target gas from a gas stream. The methods may include applying an aqueous solution to a first porous substrate, the aqueous solution comprising a polyamine and a coexistent polymer chosen from polyurethanes, polyolefin-acrylic acid copolymers, and combinations thereof. The methods may also include drying the first porous substrate having the aqueous solution thereon to form a sorbent composition impregnated in or coated on the first porous substrate that is a reaction product of the polyamine and the coexistent polymer.

In a twenty-second aspect, the disclosure provides a method according to the twenty-first aspect, in which the article is an article according to any one of the first through twentieth aspects.

In a twenty-third aspect, the disclosure provides a method according to the twenty-second aspect, in which the polyamine is a polyethylenimine.

In a twenty-fourth aspect, the disclosure provides a method according to the twenty-first or the twenty-third aspect, further including applying the aqueous solution to at least one additional porous substrate. The method may also include drying each additional porous substrate having the aqueous solution thereon; and stacking the additional porous substrates over the first porous substrate to form a stacked article.

In a twenty-fifth aspect, the disclosure provides a method according to any one of the twenty-first through the twenty-fourth aspects, in which stacking the additional porous substrates may include providing at least one spacer sheet between adjacent porous substrates.

In a twenty-sixth aspect, the disclosure provides a method according to any one of the twenty-first through the twenty-fifth aspects, further including shaping the stacked article to form a tubular sorbent article.

In a twenty-seventh aspect, the disclosure provides a method according to any one of the twenty-first through the twenty-sixth aspects, further including folding or bending the porous substrates before the shaping to maximize surface area exposed to the gas stream when the gas stream flows through the tubular sorbent article.

In a twenty-eighth aspect, the disclosure provides methods for capturing or separating a target gas from a gas stream. The methods may include flowing the gas stream through a porous substrate of an article, the porous substrate being impregnated or coated with a sorbent composition comprising a polyamine and a coexistent polymer chosen from polyurethanes, polyolefin-acrylic acid copolymers, and combinations thereof.

In a twenty-ninth aspect, the disclosure provides a method according to the twenty-eighth aspect, in which the article is an article according to any one of the first through twentieth aspects.

In a thirtieth aspect, the disclosure provides a method according to the twenty-eighth aspect or the twenty-ninth aspect, in which the article is prepared according to the method of any one of the twenty-first through the twenty-seventh aspects.

In a thirty-first aspect, the disclosure provides a method according to any one of the twenty-eighth through the thirtieth aspects, in which the polyamine includes a polyethylenimine or is a polyethylenimine.

In a thirty-second aspect, the disclosure provides a method according to any one of the twenty-eighth through the thirty-first aspects, in which the target gas is an acidic gas that adsorbs onto the sorbent composition.

In a thirty-third aspect, the disclosure provides a method according to any one of the twenty-eighth through the thirty-second aspects, in which the target gas is hydrogen sulfide, carbon dioxide, carbon disulfide, nitric oxide, nitrogen dioxide, sulfur dioxide, sulfur trioxide, mercaptans, or mixtures thereof.

In a thirty-fourth aspect, the disclosure provides a method according to any one of the twenty-eighth through the thirty-third aspects, in which the gas stream is chosen from flue gas, natural gas, gas coal gasification products, biomass gasification products, and hydrocarbon reforming products.

In a thirty-fifth aspect, the disclosure provides a method according to any one of the twenty-eighth through the thirty-fourth aspects, in which the flowing is conducted at a temperature of from about 100° C. to about 400° C.

In a thirty-sixth aspect, the disclosure provides a method according to any one of the twenty-eighth through the thirty-fifth aspects, further including heating the article to a temperature sufficient to desorb the target gas from the sorbent composition.

It should be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An article for capturing or separating a target gas from a gas stream, the article comprising a porous substrate impregnated or coated with a sorbent composition, the sorbent composition comprising a polyamine and a coexistent polymer chemically bonded to the polyamine, wherein the coexistent polymer is chosen from polyurethanes, polyolefin-acrylic acid copolymers, and combinations thereof.

2. The article of claim 1, wherein the polyamine is chosen from polyethylenimines, polyamidoamines, polyvinylamines, alkylaminoalkoxysilanes, tetraethylenepentamine, diethanolamine, diethylenetriamine, pentaethylenehexamine, tetraethylenepentamine-acrylonitrile, N-[(3-trimethoxysilyl)propyl]-ethylenediamine, N-[(3-trimethoxysilyl)propyl]diethylenetriamine, polyaziridine, and combinations thereof.

3. The article of claim 1, wherein the polyamine comprises a polyethylenimine.

4. The article of claim 1, wherein the coexistent polymer comprises a polyolefin-acrylic acid copolymer and the polyolefin-acrylic acid copolymer comprises a copolymer of ethylene and acrylic acid ammonium salt.

5. The article of claim 1, wherein the coexistent polymer comprises a polyurethane.

6. The article of claim 1, wherein the porous substrate comprises a nonwoven or woven sheet or mat containing fibers chosen from cellulosic materials, polypropylene, carbon, or activated carbon.

7. The article of claim 1, wherein the coexistent polymer is chemically bonded to both the polyamine and the porous substrate.

8. The article of claim 1, wherein:
the polyamine comprises a polyethylenimine;
the coexistent polymer comprises a polyurethane; and
the polyethylenimine is chemically bonded to the polyurethane through urea linkages.

9. The article of claim 1, wherein the target gas is hydrogen sulfide, carbon dioxide, carbon disulfide, nitric oxide, nitrogen dioxide, sulfur dioxide, sulfur trioxide, mercaptans, or mixtures thereof.

10. The article of claim 1, wherein the polyamine is a polyethylenimine having a weight-average molecular weight of from about 600 Dalton to about 15,000 Dalton.

11. The article of claim 1, wherein the weight ratio of the polyethylenimine to the coexistent polymer in the sorbent composition is from about 1:1 to about 10:1.

12. A method for preparing an article for capturing or separating a target gas from a gas stream, the method comprising:
applying an aqueous solution to a first porous substrate, the aqueous solution comprising a polyamine and a coexistent polymer chosen from polyurethanes, polyolefin-acrylic acid copolymers, and combinations thereof; and
drying the first porous substrate having the aqueous solution thereon to form a sorbent composition impregnated in or coated on the first porous substrate that is a reaction product of the polyamine and the coexistent polymer.

13. The method of claim 12, wherein the polyamine is a polyethylenimine.

14. The method of claim 12, further comprising:
applying the aqueous solution to at least one additional porous substrate;
drying each additional porous substrate having the aqueous solution thereon; and
stacking the additional porous substrates over the first porous substrate to form a stacked article.

15. The method of claim 14, wherein stacking the additional porous substrates comprises including at least one spacer sheet between adjacent porous substrates.

16. The method of claim 14, further comprising shaping the stacked article to form a tubular sorbent article.

17. A method for capturing or separating a target gas from a gas stream, the method comprising:
flowing the gas stream through a porous substrate of an article, the porous substrate being impregnated or coated with a sorbent composition comprising a polyamine and a coexistent polymer chosen from polyurethanes, polyolefin-acrylic acid copolymers, and combinations thereof.

18. The method of claim 17, wherein the polyamine is a polyethylenimine.

19. The method of claim 17, wherein the target gas is hydrogen sulfide, carbon dioxide, carbon disulfide, nitric oxide, nitrogen dioxide, sulfur dioxide, sulfur trioxide, mercaptans, or mixtures thereof.

20. The method of claim 17, wherein the flowing is conducted at a temperature of from about 100° C. to about 400° C.

* * * * *